US012253829B2

(12) United States Patent
Allimann et al.

(10) Patent No.: US 12,253,829 B2
(45) Date of Patent: Mar. 18, 2025

(54) WATCH CASE COMPRISING A BACK ORIENTED IN A PREDEFINED ANGULAR POSITION

(71) Applicant: The Swatch Group Research and Development Ltd, Marin (CH)

(72) Inventors: Joël Allimann, Vallon (CH); Simon Garcin, Salavaux (CH)

(73) Assignee: The Swatch Group Research and Development Ltd, Marin (CH)

( * ) Notice: Subject to any disclaimer, the term of this patent is extended or adjusted under 35 U.S.C. 154(b) by 297 days.

(21) Appl. No.: 17/943,756

(22) Filed: Sep. 13, 2022

(65) Prior Publication Data

US 2023/0168633 A1 Jun. 1, 2023

(30) Foreign Application Priority Data

Dec. 1, 2021 (EP) .................................... 21211730

(51) Int. Cl.
*G04B 37/00* (2006.01)

(52) U.S. Cl.
CPC ................................ *G04B 37/0008* (2013.01)

(58) Field of Classification Search
CPC .. G04B 37/0008; G04B 37/005; G04B 37/11; G04B 37/0033; G04G 17/02; G04G 17/08
See application file for complete search history.

(56) References Cited

U.S. PATENT DOCUMENTS

| | | | | |
|---|---|---|---|---|
| 3,722,208 A * | 3/1973 | Ryser | G04B 37/11 | 368/286 |
| 6,761,479 B2 * | 7/2004 | Meyrat | G04B 37/0008 | 368/310 |
| 8,547,802 B2 * | 10/2013 | Hiranuma | G04B 19/14 | 368/205 |
| 8,619,506 B2 * | 12/2013 | Hiranuma | G04C 10/02 | 368/205 |

(Continued)

FOREIGN PATENT DOCUMENTS

| | | |
|---|---|---|
| EP | 1 278 108 A1 | 1/2003 |
| EP | 2 565 733 A2 | 3/2013 |

(Continued)

OTHER PUBLICATIONS

European Search Report for EP 21 21 1730 dated Apr. 29, 2022.

*Primary Examiner* — Edwin A. Leon
(74) *Attorney, Agent, or Firm* — Sughrue Mion, PLLC

(57) ABSTRACT

A watch case (10) including a back (30) driven into a middle (20) by a joint (40), and including a body (31) from which radially extends a lip (32), the body (31) including an axial annular shoulder (310) and the lip (32) including a radial annular shoulder (320). The middle (20) has an axial opening (21), an axial annular shoulder (200), and a radial annular shoulder (201) resting against the radial annular shoulder of the lip, the joint being interposed between the axial annular shoulders. The axial annular shoulders have peripheral profiles of complementary shapes, substantially circular, including one and the other, a first circular-arc- (Continued)

shaped portion having a first radius (R1, R2), and a second circular-arc-shaped portion to which is connected the first portion, having a second radius (r1, r2) the value of which is lower than that of the first radius (R1, R2).

7 Claims, 1 Drawing Sheet

(56) References Cited

U.S. PATENT DOCUMENTS

| | | | | |
|---|---|---|---|---|
| 8,931,949 | B2 * | 1/2015 | Erard | G04B 19/283<br>368/295 |
| 10,025,273 | B2 * | 7/2018 | Iguchi | G04B 37/0008 |
| 10,534,324 | B2 * | 1/2020 | Chung | G04G 17/08 |
| 11,630,422 | B2 * | 4/2023 | Tschumi | G04B 37/087<br>368/295 |
| 11,650,547 | B2 * | 5/2023 | Tschumi | A44C 5/147<br>368/291 |
| 11,774,912 | B2 * | 10/2023 | Allimann | G04B 37/0033<br>368/309 |
| 2010/0142332 | A1 | 6/2010 | Hiranuma et al. | |
| 2013/0329537 | A1 | 12/2013 | Erard | |
| 2016/0252882 | A1 | 9/2016 | Meyer et al. | |

FOREIGN PATENT DOCUMENTS

| | | | |
|---|---|---|---|
| GB | 1 042 457 | A | 9/1966 |
| JP | 2010-127683 | A | 6/2010 |
| JP | 2013-50420 | A | 3/2013 |

* cited by examiner

WATCH CASE COMPRISING A BACK ORIENTED IN A PREDEFINED ANGULAR POSITION

CROSS REFERENCE TO RELATED APPLICATIONS

This application claims priority to European Patent Application No. 21211730.3 filed Dec. 1, 2021.

TECHNICAL FIELD OF THE INVENTION

The invention falls within the field of horology, and particularly components of a watch case.

More particularly, the invention relates to a watch case including a back oriented in a predefined angular position.

TECHNOLOGICAL BACKGROUND

Watch cases include a middle on either side of which are fastened a crystal and a back.

The back may be fastened to the middle by screwing, by bayonet type assembling or by tight-fit by mounting on the press, that is to say by driving.

In the case of fastening the back to the middle by driving, a joint is arranged in the middle and is radially compressed by the back against the middle during the driving of the back into the middle. The joint has the effect of giving the case a desired level of water-resistance and airtightness, as well as ensuring the mechanical strength of the assembly.

When it has, on a visible surface, a pattern such as a logo of a brand, it is desirable that the back is oriented so that said pattern is aligned in relation to a 6 o'clock-12 o'clock vertical axis, particularly for perceived quality reasons.

The orientation of the back in relation to the middle is generally performed manually by a suitable pre-positioning of the back in relation to the middle before mounting on the press, with the aid of visual marks present on the middle or the back, for example thanks to a notch for the adjustment rod.

In the case of this type of fastening of the back to the middle, the accuracy of the orientation of the back therefore essentially depends on the dexterity of the operator performing the pre-positioning of the back in relation to the middle.

It is fully understood that the level of quality of the assemblies performed may vary significantly.

Therefore, there is a need to perform assemblies of watch cases wherein the orientation of the back in relation to the middle is controlled, so as to obtain a high and constant level of quality.

SUMMARY OF THE INVENTION

The invention resolves the aforementioned drawbacks by proposing a solution making it possible to control the orientation of the back in relation to the middle during its tight-fit fastening.

To this end, the present invention relates to a watch case comprising a back driven into a middle by means of a joint, the back including a body from which radially extends a lip, said body comprising an axial annular shoulder and said lip comprising a radial annular shoulder.

The middle includes an axial opening and has an axial annular shoulder extending opposite the axial annular shoulder of the body of the back, and a radial annular shoulder resting against the radial annular shoulder of the lip.

The joint is interposed between the axial annular shoulders of the middle and of the back, said axial annular shoulders having peripheral profiles of complementary shapes, substantially circular, comprising one and the other, a first circular-arc-shaped portion having a first radius R1, R2, and a second circular-arc-shaped portion to which the first portion is connected, having a second radius r1, r2 the value of which is lower than that of the first radius R1, R2.

In particular embodiments, the invention may further include one or more of the following features, taken alone or according to any technically possible combinations.

In particular embodiments, the value of the second radius r1, r2 is greater than half the value of first radius R1, R2.

In particular embodiments, the peripheral profile of the axial annular shoulders of the middle and of the back comprise first and second circular-arc-shaped portions alternately distributed, one after another.

In particular embodiments, the axial annular shoulders of the middle and of the back are configured so that the sagittas of the first and second circular-arc-shaped portions are separated from one another by an angle of 60 degrees.

In particular embodiments, the axial annular shoulders of the middle and of the back are configured so that the sagittas of the circular-arc-shaped portions define segments of intersecting lines in a point materializing the centre of the opening.

In particular embodiments, the shape defined by the peripheral profile of the axial annular shoulders is convex.

In particular embodiments, the joint has a profile complementary to those of the axial annular shoulders of the middle and of the back.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
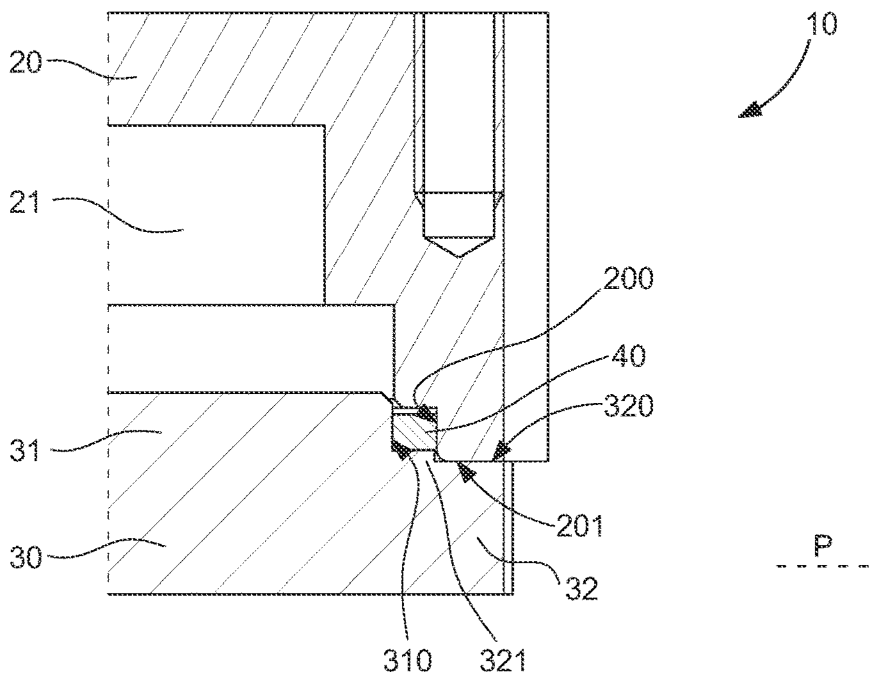
FIG. 1 shows a sectional view according to a radial plane of a portion of a case according to a preferred example of embodiment of the invention.

The present invention relates to a watch case 10 a portion of which is shown in the sectional view according to a radial plane of said watch case 10 of FIG. 1.

The watch case 10 includes a middle 20 of generally circular shape including an axial opening 21 receiving a crystal (not shown) at one of its ends referred to as "upper end" opposite a back 30 driven at another end of said middle 20, referred to as "lower end". The crystal, the back 30 and the middle 20 define a volume inside of which is arranged a horological movement, in a manner known by the person skilled in the art.

As the horological movement and the other horological components used in a watch case 10 are known by the person skilled in the art and do not form part of the present invention, they are not shown in the figures, or described hereafter.

The back 30 has a generally circular shape and includes a body 31 from which radially extends a lip 32 forming a peripheral shoulder in relation to said body 31. More specifically, as shown in the sectional view of FIG. 1, the shoulder is formed by an axial annular shoulder 310 of the body 31 and by a radial annular shoulder 320 of the lip 32.

Said axial 310 and radial annular shoulders 320 are provided to constitute bearing surfaces as described in more detail hereafter.

The axial and radial directions are defined in the present text relative to the watch case 10, and in particular relative to the opening 21 of the middle 20. In a manner known in the field of horology, the axial direction extends from one another of the upper and lower ends of the middle 20 and the radial direction extends perpendicularly to said axial direction.

At its lower end, the middle 20 has an axial annular shoulder 200 extending opposite the axial annular shoulder 310 of the back 30. This axial annular shoulder 200 is connected to a radial annular shoulder 201 resting against the radial annular shoulder 320 of the lip 32. The radial annular shoulder 201 of the middle 20 forms an end surface of said middle 20 in the preferred example of embodiment of the invention shown in the figures.

An annular joint 40 is advantageously interposed between the axial annular shoulders 200 and 310 respectively of the middle 20 and of the back 30, and is compressed by one and the other of said axial annular shoulders 200 and 310, as shown in FIG. 1. This compression of the joint 40 makes it possible to give a water-resistance and airtightness to the watch case according to a desired level and generates a torque making it possible to fasten the back 30 on the middle 20.

Figure 2:
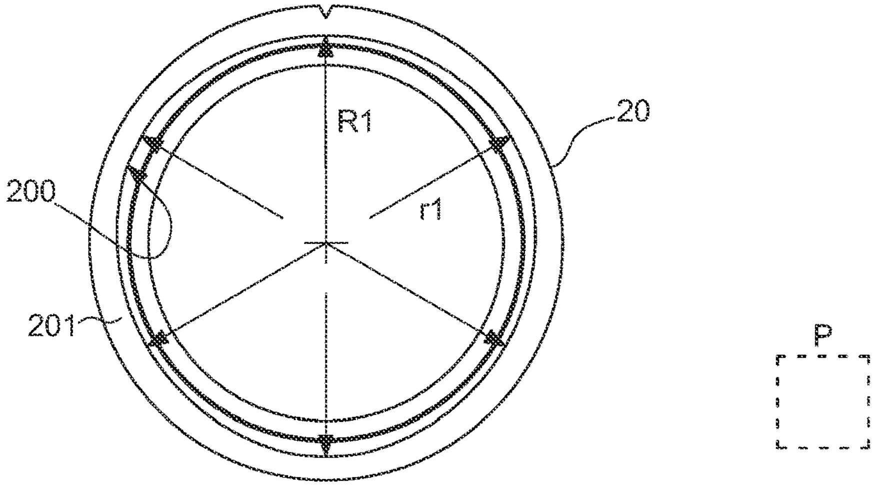
FIGS. 2 and 3 show respectively a top view of a back of the case of FIG. 1 and a bottom view of a middle of the case of FIG. 1.
Figure 3:
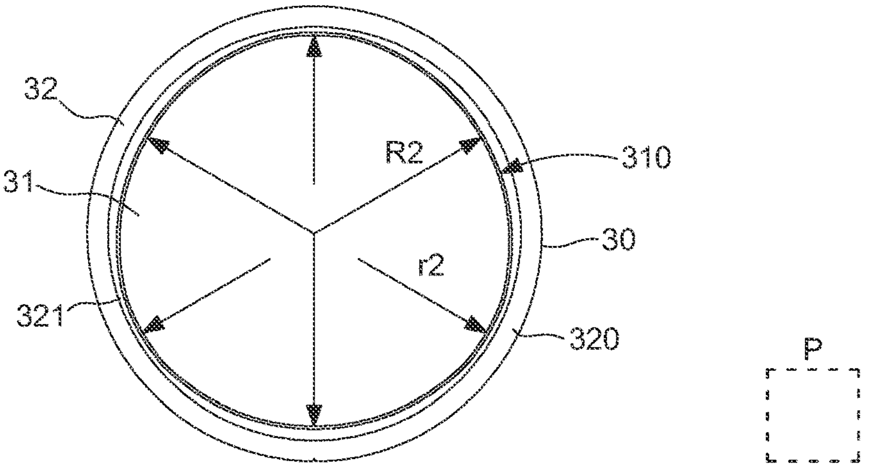

Advantageously, the axial annular shoulders 200 and 310 of the middle 20 and of the back 30 are of complementary shapes, and do not have a revolution shape. On the contrary, although it has a substantially circular shape, as shown in FIGS. 2 and 3, their respective peripheral profile includes a first circular-arc-shaped portion having a first radius R1, R2 and a second circular-arc-shaped portion connected to the first portion and having a second radius r1, r2 smaller than the first radius R1, R2. The first portions of the middle 20 and of the back 30 are intended to rest facing one another, in the same way that the second portions of the middle 20 and of the back 30 are intended to rest facing one another.

The first and second radii R1, R2 and r1, r2 are shown in FIGS. 2 and 3 by sagittas.

The term "peripheral profile" defines in the present text the projection of the axial annular shoulders 200 and 310 respectively of the middle 20 and of the back 30 on a plane P perpendicular to the axial direction and parallel to the radial direction. In other words, the plane P is parallel to the radial annular shoulders 201 and 320 of the middle 20 and of the lip 32, such as shown in FIGS. 1 and 2.

The term "complementary" means that the shapes of the axial annular shoulders 200 and 310 are identical, only the dimensions of said axial annular shoulders varying in relation to one another.

These conformations of the back 30 and of the middle 20, visible respectively in FIGS. 2 and 3, make it possible to guarantee the performance of the water-resistance and airtightness of the watch case 10 by preserving the peripheral profile of the axial annular shoulders 200 and 310 of any angle, broken line or edge, etc., by the continuity of the curved surfaces, while playing a role of polarizer in the orientation of the back 30 opposite the middle 20 during their assembly with one another.

Indeed, to drive the back 30 into the middle 20, it is then only possible to orient the back 30 according to a position wherein the shapes of the axial annular shoulders 200 and 310 are aligned with one another, that is to say a position wherein the first portions are arranged facing one another and the second portions are arranged facing one another.

Advantageously, to guarantee a high level of water-resistance and airtightness the shape defined by the peripheral profile of the axial annular shoulders 200 and 310 of the middle 20 and of the back 30 is convex, inasmuch as said axial annular shoulders 200 and 310 are located respectively entirely on the same side of a tangent line applied in any point of their peripheral profile. The term "convex" is used here in its definition specific to the field of geometry.

Preferably, in a preferred example of embodiment of the invention, the values of the second radii r1, r2 of the second portions of the axial annular shoulders 200 and 310 of the middle 20 and of the back 30 are respectively greater than half the values of the first radii R1, R2 of the first portions of the middle 20 and of the back 30.

This feature contributes to the continuity of the curved surfaces and therefore to preventing that the shape of the peripheral profile of the axial annular shoulders 200 and 310 does not include edge or broken line angles.

In particular, the difference between the values of the first and of the second radii R1 and r1 of the axial annular shoulder 200 of the middle 20, as well as the difference between the values of the first and of the second radii R2 and r2 of the axial annular shoulder 310 of the back 30, is in the order of a few millimetres or tenths of millimetres.

As shown in FIGS. 2 and 3, the shape of the axial annular shoulders 200 and 310 of the middle 20 and of the back 30 comprises a plurality of first and second circular-arc-shaped portions alternately distributed, one after another. In other words, two successive first circular-arc-shaped portions are connected to one another by a second circular-arc-shaped portion and two successive second circular-arc-shaped portions are connected to one another by a first circular-arc-shaped portion.

In the preferred example of embodiment of the invention, the axial annular shoulders 200, 310 of the middle 20 and of the back 30 are configured so that the sagittas of the first and second circular-arc-shaped portions are separated from one another by an angle of 60 degrees. The notion of *sagitta* of a circular arc is known by the person skilled in the art. This angle easily acts as an effective polarizer making it possible to orient a back in a middle. An orientation defect would be rapidly perceptible and correctable for the operator.

In other terms, the axial annular shoulders 200 and 310 of the middle 20 and of the back 30 include three first portions and three second circular-arc-shaped portions alternately distributed one after another.

Moreover, the *sagitta* of the circular-arc-shaped portions define segments of intersecting lines in a point materializing the centre of the opening 21.

Preferably, the joint 40 has a peripheral profile complementary to those of the axial annular shoulder 310 of the lip 32 and of the axial annular shoulder 200 of the middle 20.

In FIG. 1, the joint 40 has been shown with a rectangular-shaped cross-section. In other examples of embodiment of the invention, it may include a circular or other shaped cross-section.

Advantageously, the radial annular shoulder 320 of the back 30 may include an annular added thickness 321 to receive the bearing joint 40, as shown in FIGS. 1 and 3. Thus, the radial annular shoulder 201 of the middle 20 rests against an end portion of the radial annular shoulder 320 of the back 30.

The back 30 and the middle 20 may be made of any suitable material, for example metal, such as steel or precious metal, ceramic, etc.

The joint 40 may also be made of any suitable material, such as polymer, having a Shore D hardness of 75±10.

More generally, it should be noted that the implementations and embodiments considered above have been described by way of non-limiting examples, and that other variants are consequently possible.

For example, it is possible that the peripheral profile of the axial annular shoulders 200 and 310 of the middle 20 and of the back 30 has more than two circular-arc-shaped portions the radii of which are different and/or that it includes more than three first portions and more than three second circular-arc-shaped portions alternately distributed one after another.

The invention claimed is:

1. A watch case comprising:
a middle; and
a back fastened into the middle via a joint,
wherein the back comprises a body and a lip extending radially from the body,
wherein the body comprises a first axial annular shoulder extending in a first axial direction and the lip comprises a radial annular shoulder,
wherein the middle comprises an axial opening, a second axial annular shoulder extending in a second axial direction opposite of the first axial direction, and a second radial annular shoulder contacting the first radial annular shoulder,
wherein the joint is interposed between the first axial annular shoulder and the second axial annular shoulder,
wherein each of the first axial annular shoulder and the second axial annular shoulder have peripheral profiles of substantially circular complementary shapes, and one of the first axial annular shoulder and the second axial annular shoulder comprises a first arc-shaped portion having a first radius, and the other of the first axial annular shoulder and the second axial annular shoulder comprises a second arc-shaped portion connected to the first arc-shaped portion, the second arc-shaped having a second radius less than the first radius.

2. The watch case according to claim 1, wherein the value of the second radius is greater than half the value of the first radius.

3. The watch case according to claim 1, wherein the peripheral profile of each of the first axial annular shoulder and the second axial annular shoulder comprise a plurality of first and second arc-shaped portions alternately distributed, one after another.

4. The watch case according to claim 1, wherein a sagitta of the first arc-shaped portions and a sagitta of the second arc-shaped portion are separated from one another by an angle of 60 degrees.

5. The watch case according to claim 1, wherein a sagitta of the first arc-shaped portion and a sagitta of the second arc-shaped portion define segments of intersecting lines in a center point of the opening.

6. The watch case according to claim 1, wherein a convex shape is defined by the peripheral profile of the first axial annular shoulder and the second axial annular shoulder.

7. The watch case according to claim 1, wherein the joint has a profile complementary to the peripheral profile of the first axial annular shoulder and the second axial annular shoulder.

* * * * *